US00RE40762E

(19) United States
(12) Reissued Patent
Matsuda et al.

(10) Patent Number: US RE40,762 E
(45) Date of Reissued Patent: Jun. 23, 2009

(54) JET-PROPULSION WATERCRAFT

(75) Inventors: Yoshimoto Matsuda, Hyogo (JP); Yukio Asakura, Hyogo (JP)

(73) Assignee: Kawasaki Jukogyo Kabushiki Kaisha, Kobe (JP)

(21) Appl. No.: 10/957,523

(22) Filed: Oct. 1, 2004

Related U.S. Patent Documents

Reissue of:
(64) Patent No.: 6,722,302
Issued: Apr. 20, 2004
Appl. No.: 09/953,797
Filed: Sep. 17, 2001

(30) Foreign Application Priority Data

Sep. 18, 2000 (JP) ..... 2000-281374

(51) Int. Cl.
*B63H 25/04* (2006.01)

(52) U.S. Cl. ..... 114/144 R; 440/1
(58) Field of Classification Search ..... 440/1, 440/2, 38, 84–87; 114/144 R
See application file for complete search history.

(56) References Cited

U.S. PATENT DOCUMENTS 3,292,052 A * 12/1966 Richter et al. ..... 361/180
6,159,059 A * 12/2000 Bernier et al. ..... 440/40
6,336,833 B1 * 1/2002 Rheault et al. ..... 440/1
6,733,350 B2 * 5/2004 Iida et al. ..... 440/84

FOREIGN PATENT DOCUMENTS

JP 200-6708 * 7/2001
JP 2000-6708 7/2001
JP P2001-322596 A * 11/2001
JP P2001-322597 A * 11/2001

* cited by examiner

*Primary Examiner*—Ed Swinehart
(74) *Attorney, Agent, or Firm*—Marshall, Gerstein & Borun LLP

(57) ABSTRACT

A jet-propulsion watercraft, comprises a steering position sensor for detecting a steering operation of a steering operation means. A steering means adapted to be subjected to a steering assist mode control, when a signal indicating that the steering position sensor has detected the steering operation is received from the steering position sensor. A control device that gives a signal to the steering position sensor and receives a signal indicating that the steering operation means is or is not steered from the steering position sensor, and the signal from the steering position sensor is set equal in level to the signal given from the control device to the steering position sensor when the steering operation means is not steered.

10 Claims, 13 Drawing Sheets

| | HANDLE STEERING POSITION | | |
|---|---|---|---|
| | LEFT | NEUTRAL | RIGHT |
| PROXIMITY SWITCH Ec SIDE TERMINAL | LOW | HI | LOW |
| PROXIMITY SWITCH EARTH SIDE TERMINAL | LOW | LOW | LOW |
| PROXIMITY SWITCH SIDE TERMINAL OF Ec IN DISCONNECTED STATE | HI | HI | HI |

Fig. 4 A

| | HANDLE STEERING POSITION | | |
|---|---|---|---|
| | LEFT | NEUTRAL | RIGHT |
| PROXIMITY SWITCH Ec SIDE TERMINAL | HI | LOW | HI |
| PROXIMITY SWITCH EARTH SIDE TERMINAL | HI | HI | HI |
| PROXIMITY SWITCH SIDE TERMINAL OF Ec IN DISCONNECTED STATE | LOW | LOW | LOW |

Fig. 4 B

JET-PROPULSION WATERCRAFT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a jet-propulsion watercraft such as a personal watercraft (PWC) which ejects water rearward and planes on a water surface as the resulting reaction. More particularly, the present invention relates to a jet-propulsion watercraft comprising a device that can maintain steering capability even when the throttle is operated in the closed position and propulsion force is thereby reduced.

2. Description of the Related Art

In recent years, so-called jet-propulsion personal watercraft have been widely used in leisure, sport, rescue activities, and the like. The jet-propulsion watercraft is configured to have a water jet pump that pressurizes and accelerates water sucked from a water intake generally provided on a bottom of a hull and ejects it rearward from an outlet port. Thereby, the watercraft is propelled.

In the jet-propulsion watercraft, a steering nozzle provided behind the outlet port of the water jet pump is swung either to the right or to the left, to change the ejecting direction of the water to the right or to the left, thereby turning the watercraft to the right or to the left.

In the above-described jet-propulsion watercraft, when the throttle is moved to a substantially full closed position and the water ejected from the water jet pump is thereby reduced, the propulsion force necessary for turning the watercraft is correspondingly reduced, and the steering capability of the watercraft is therefore reduced until the throttle is re-opened.

To solve the above-described condition, the applicant disclosed a jet-propulsion watercraft comprising a steering component to mechanically create steering capability even when the throttle is moved to a substantially fully closed position and the water ejected from the water jet pump is thereby reduced (see Japanese Patent Application No. Hei. 2000-6708).

In the jet-propulsion watercraft comprising the above-described steering component, the number of parts is increased, which results in a complex structure and increased weight. As a solution to this, there has been proposed a jet-propulsion watercraft adapted to execute the control for increasing an engine speed to thereby allow the amount of ejected water to be maintained and the steering capability to be thereby maintained (herein referred to as "steering assist mode control") when detecting a throttle-close operation of the throttle operation means and a steering operation of a steering operation means (see Japanese Patent Application Nos. 2000-6708, and 2000-142664, and 2000-142639) assigned to the same assignee as herein.

SUMMARY OF THE INVENTION

The present invention addresses the above-described condition, and an object of the present invention is to provide a jet-propulsion watercraft which is adapted not to execute a steering assist mode control when detecting a throttle-close operation of a throttle operation means in a normal cruising state and if a signal line for detecting a steering operation of the steering operation means is disconnected.

According to the present invention, there is provided a jet-propulsion watercraft, comprising: a water jet pump that pressurizes and accelerates sucked water and ejects the water from an outlet port provided behind the water jet pump to propel the watercraft as a reaction of the ejecting water; a steering position sensor for detecting a steering operation of a steering operation means; a steering means adapted to be subjected to a steering assist mode control, when a signal indicating that the steering position sensor has detected the steering operation is received from the steering position sensor; and a control device that gives a signal to the steering position sensor and receives a signal indicating that the steering operation means is or is not steered from the steering position sensor, wherein the signal from the steering position sensor is set equal in level to the signal being given from the control device to the steering position sensor when the steering operation sensor is not steered.

In the jet-propulsion watercraft so configured, when the signal line connected to the steering position sensor is disconnected in a normal cruising state, the signal equal in level to the signal in the unsteered state is obtained from the steering position sensor. As a result, the steering assist mode control is not executed, and the normal drive cruising state can be maintained.

It is preferable that in the jet-propulsion watercraft, the signal from the steering position sensor is a HIGH level signal and the signal being given from the control device to the steering position sensor is a HIGH level signal when the steering operation means is not steering. Since no noise invades the signal, a noise-proof configuration is achieved.

In the jet-propulsion watercraft, the signal from the steering position senor may be a LOW level signal and the signal being given from the control device to the steering position sensor may be a LOW level signal when the steering operation means is not steered.

It is preferable that in the jet-propulsion watercraft, the steering position sensor comprises a proximity switch having two proximity sensors provided on a portion of a rotational shaft of the steering operation means of the watercraft, one terminal of each of the proximity sensors is connected to the control device to allow a voltage of HIGH level to be applied to the one terminal from the control device, and the other terminal of each of the proximity sensors is electrically grounded, and when the steering operation means is steered, the proximity sensor placed on a steered side is activated to short the terminals of the proximity sensor to cause the voltage to change from HIGH level to LOW level.

In the jet-propulsion watercraft, the steering position sensor may comprise a proximity switch having two proximity sensors provided on a portion of a rotational shaft of the steering operation means of the watercraft, one terminal of each of the proximity sensors may be electrically grounded through the control device and the other terminal of each of the proximity sensors may be connected to an electric power source to allow a voltage of HIGH level to be applied to the other terminal from the electric power source, and when the steering operation means is steered, the proximity sensor placed on a steered side may be activated to short the terminals of the proximity switch to cause the voltage to change from LOW level to HIGH level.

Herein, the "throttle-close operation" of the throttle operation means indicates that an operation is performed to bring the throttle toward a closed position by a predetermined amount or more.

The "steering assist mode control" refers to the control for increasing the engine speed to allow the amount of ejected water to be maintained and the steering capability to be thereby maintained.

The above and further objects and features of the invention will more fully be apparent from the following detailed description of the accompanying drawings.

BRIEF DESCRIPTION OF THE DRAWINGS

FIG. 4A is a table showing an electric logic of the steering position sensor portion of FIG. 3A;

FIG. 4B is a table showing an electric logic of the steering position sensor portion of FIG. 3B;

DETAILED DESCRIPTION OF THE PREFERRED EMBODIMENTS

Hereinafter, a jet-propulsion watercraft according to an embodiment of the present invention will be described with reference to accompanying drawings. In the embodiment below, a personal watercraft will be described.

Figure 6:
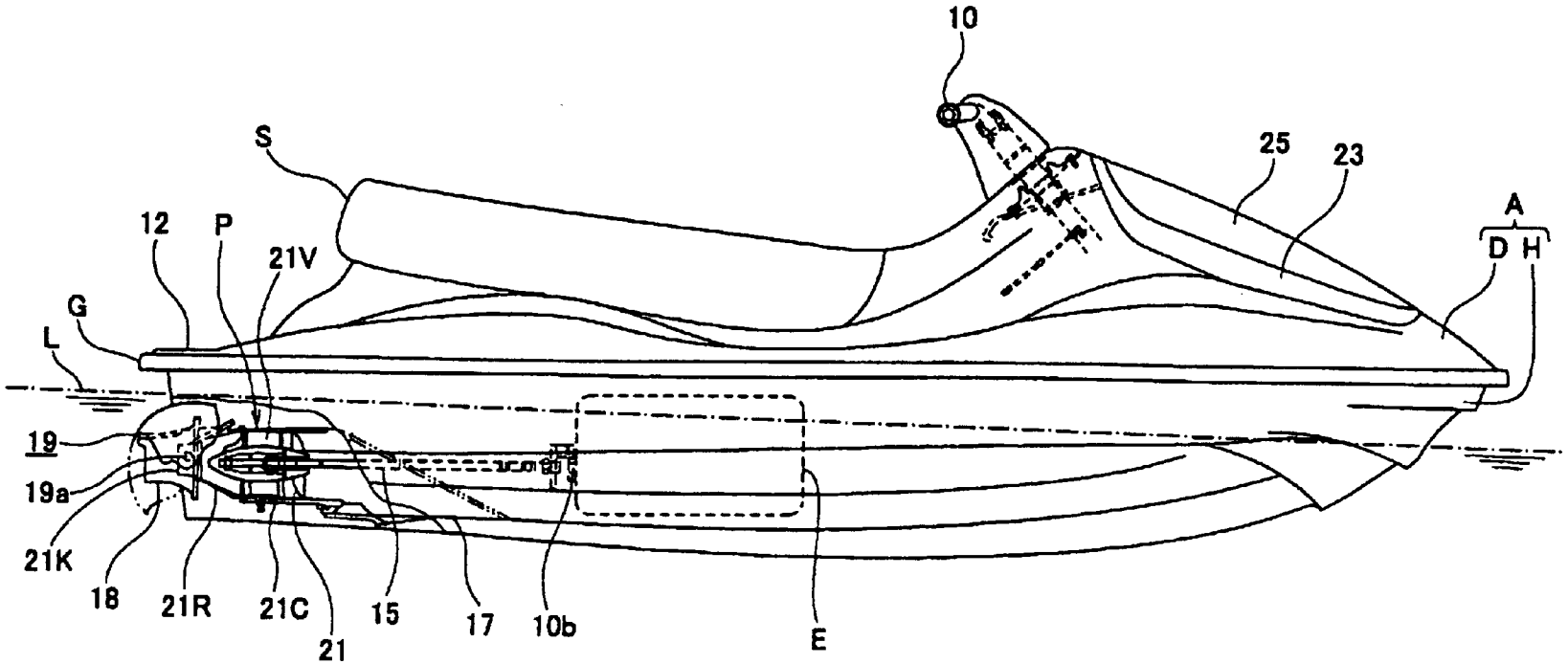
FIG. 6 is a side view showing an entire personal watercraft according to the embodiment of the present invention.
Figure 7:
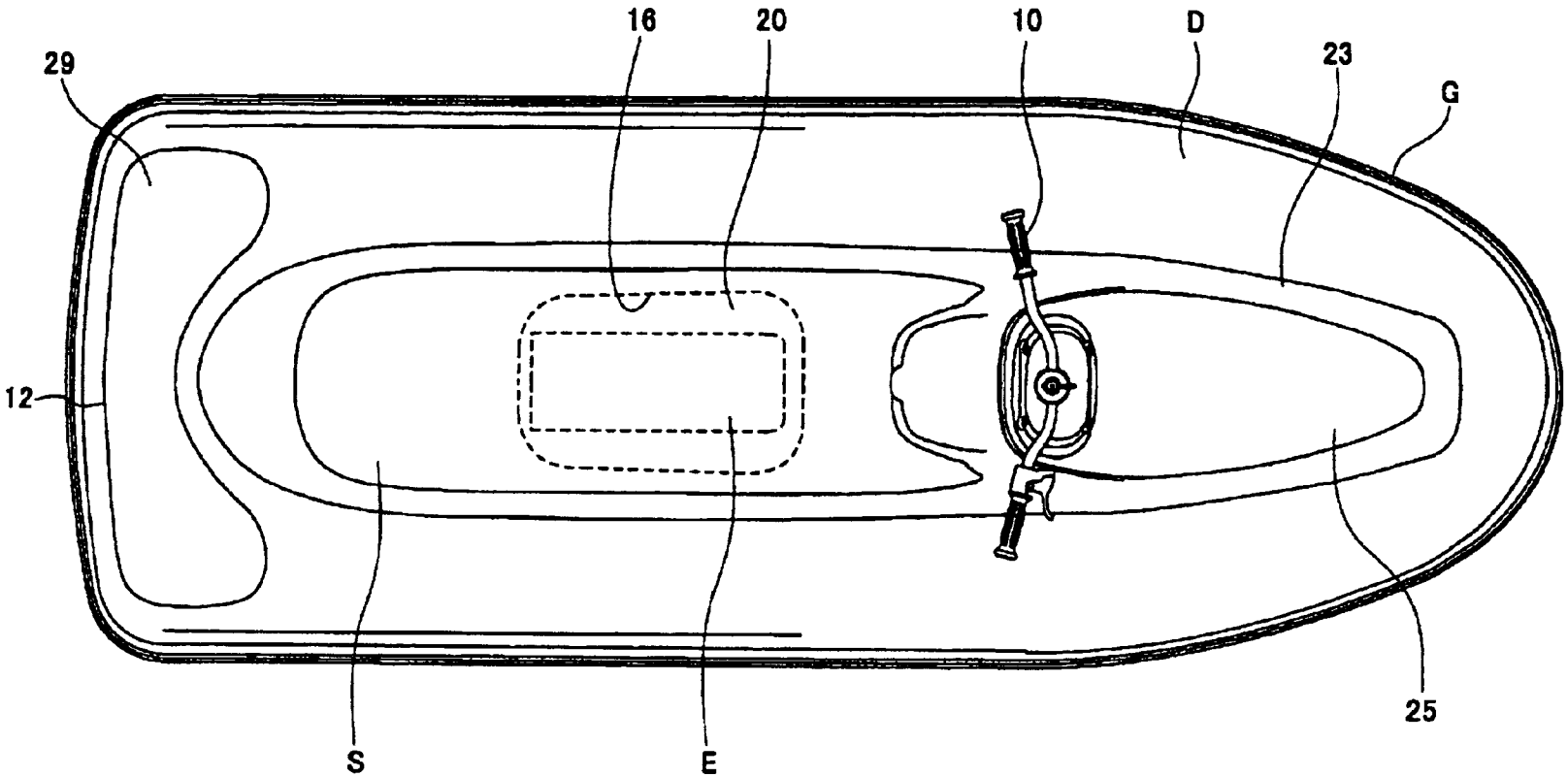
FIG. 7 is a plan view showing the entire personal watercraft of FIG. 6.

Referring now to FIGS. 6, 7, reference numeral A denotes a body of the personal watercraft. The body A comprises a hull H and a deck D covering the hull H from above. A line at which the hull H and the deck D are connected over the entire perimeter thereof is called a gunnel line G. In this embodiment, the gunnel line G is located above a waterline L of the personal watercraft.

As shown in FIG. 7, an opening 16, which has a substantially rectangular shape seen from above, is formed at a relatively rear section of the deck D such that it extends in the longitudinal direction of the body A, and a riding seat S is provided above the opening 16 such that it covers the opening 16 from above as shown in FIGS. 6, 7.

An engine E is provided in a chamber 20 surrounded by the hull H and the deck D below the seat S.

The engine E includes multiple cylinders (e.g., three-cylinders). As shown in FIG. 6, a crankshaft 10b of the engine E is mounted along the longitudinal direction of the body A. An output end of the crankshaft 10b is rotatably coupled integrally with a pump shaft of a water jet pump P through a propeller shaft 15. An impeller 21 is mounted on the pump shaft of the water jet pump P. The impeller 21 is covered with a pump casing 21C on the outer periphery thereof. A water intake 17 is provided on the bottom of the hull H. The water is sucked from the water intake 17 and fed to the water jet pump P through a water intake passage. The water jet pump P pressurizes and accelerates the water. The pressurized and accelerated water is discharged through a pump nozzle 21R having a cross-sectional area of flow gradually reduced rearward, and from an outlet port 21K provided on the rear end of the pump nozzle 21R, thereby obtaining propulsion force.

In FIG. 6, reference numeral 21V denotes fairing vanes for fairing water flow behind the impeller 21. As shown in FIGS. 6,7, reference numeral denotes a bar-type steering handle as a steering operation means. The handle 10 is operated to the right or to the left in association with the steering nozzle 18 provided behind the pump nozzle 21R such that the steering nozzle 18 is swingable to the right or to the left. The watercraft can be turned to any desired direction while the water jet pump P is generating a propulsion force.

As shown in FIG. 6, a bowl-shaped reverse deflector 19 (see FIG. 6) is provided above the rear side of the steering nozzle 18 such that it can swing downward around a horizontally mounted swinging shaft 19a.

The deflector 19 is swung downward toward a lower position behind the steering nozzle 18 to deflect the water ejected from the steering nozzle 18 forward, and as the resulting reaction, the personal watercraft moves rearward.

In FIGS. 6, 7, reference numeral 12 denotes a rear deck. The rear deck 12 is provided with an openable hatch cover 29. A rear compartment (not shown) with a small capacity is provided under the hatch cover 29. Reference numeral 23 denotes a front hatch cover. A front compartment (not shown) is provided under the front hatch cover 23 for storing equipment and the like. A hatch cover 25 is provided over the front hatch cover 23, thereby forming a two layer cover. A life jacket and the like can be stored under the hatch cover 25 through an opening (not shown) provided in the rear end thereof.

Figure 8:
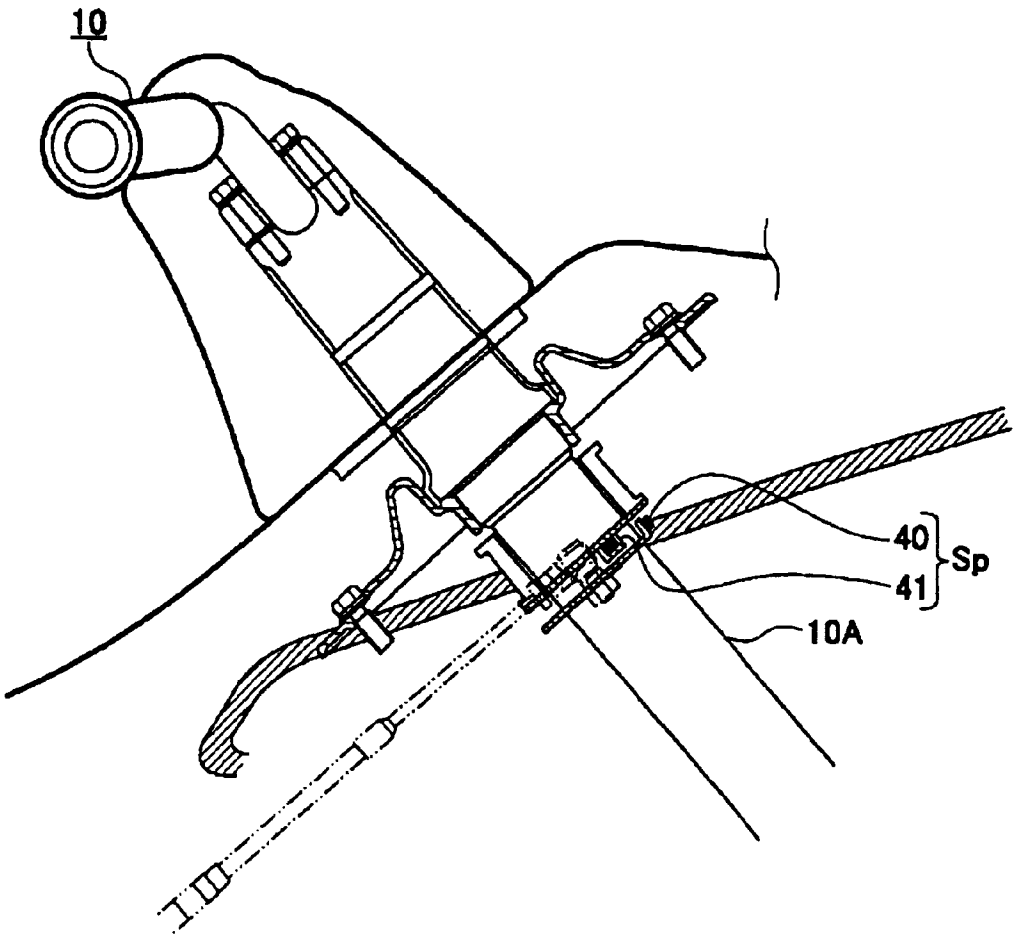
FIG. 8 is a partially enlarged crosssectional view of a vicinity of the steering operation means of FIG. 6, showing placement and structure of the steering position sensor.
Figure 9:
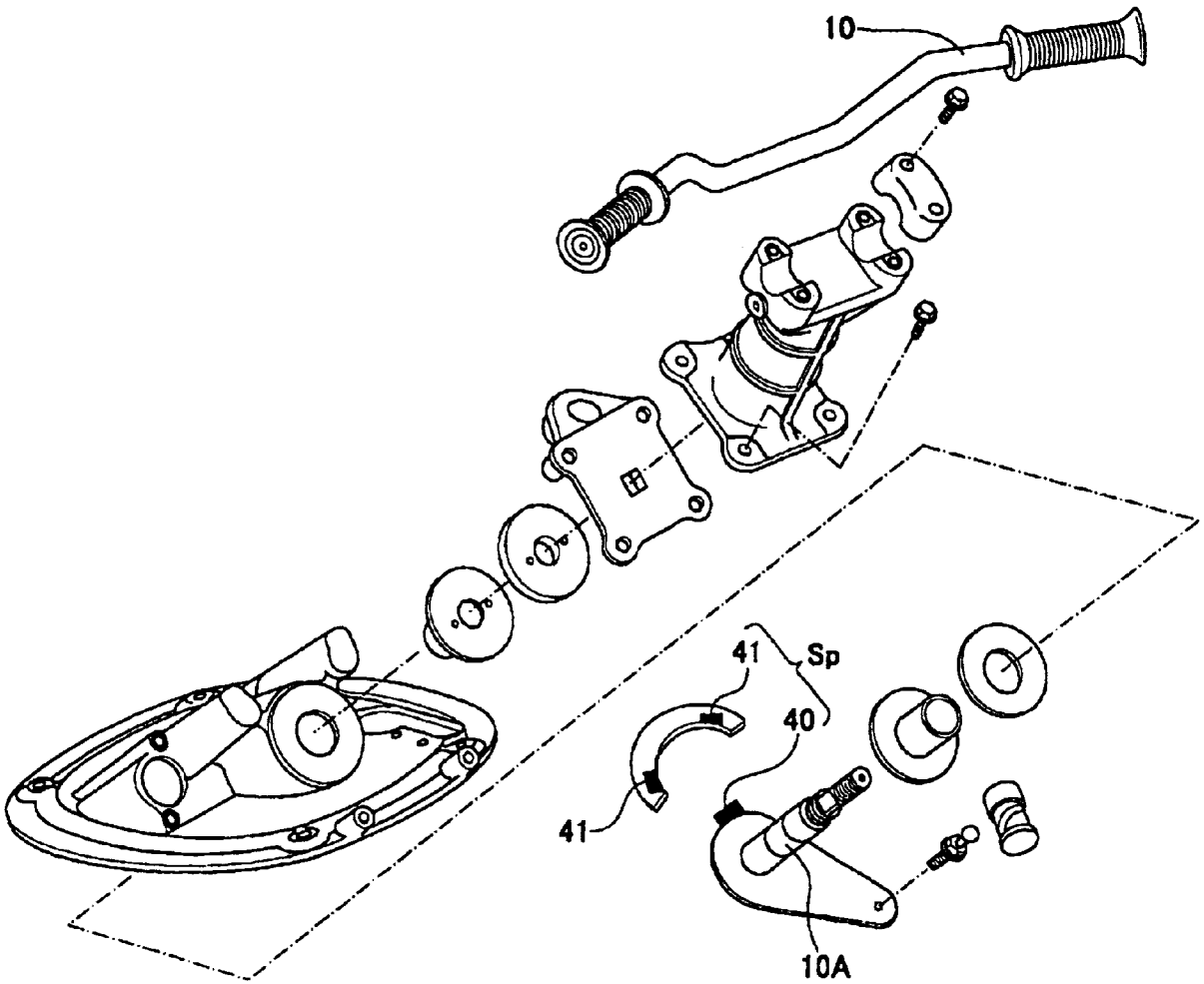
FIG. 9 is an exploded perspective view of a vicinity of the steering operation means, showing placement of the steering position sensor of FIG. 8 and a structure of its vicinity.

In the personal watercraft of this embodiment, as shown in FIGS. 8, 9, a steering position sensor Sp constituted by a proximity switch is provided on a rotational side and a fixed side of a portion of a rotational shaft 10A of the steering handle 10. In this embodiment, the steering position sensor Sp is configured such that a permanent magnet 40 is provided to a portion of an annular-shaped member fixed to the rotational shaft on the rotational side and two proximity sensors 41 are provided on the fixed side. When the permanent magnet 40 comes close to one of the proximity sensors 41, the sensor 41 is turned ON, and when the permanent magnet 40 goes away from one of the proximity sensors 41, the sensor is turned OFF.

Figure 3A:
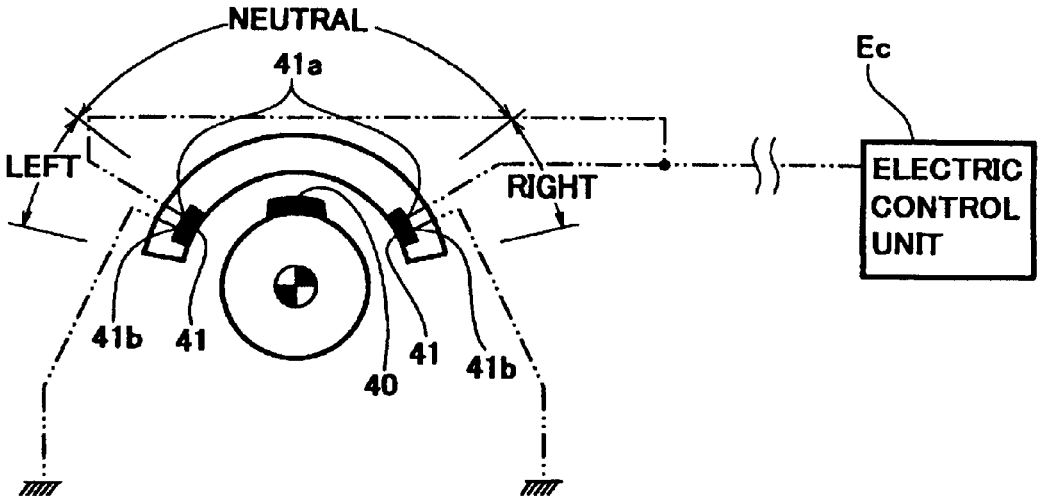
FIG. 3A is a schematic view showing a structure of a steering position sensor portion of the jet-propulsion watercraft according to the embodiment of the present invention.

As shown in FIG. 3A, in the steering position sensor Sp, each of the proximity sensors 41 has two terminals, and one terminal (Ec side terminal) 41a of the two terminals is electrically connected to the electric control unit Ec to allow DC 12V to be supplied to the one terminal from the side of the electric control unit Ec, while the other terminal (such side terminal) 41b of each of the proximity switches 41 is electrically grounded.

When the permanent magnet 40 comes close to one of the proximity sensors 41, the proximity sensor 41 is turned ON (closed), and thereby a current flows from the terminal 41a to the terminal 41b, i.e., from the electric control unit Ec to the earth. As a result, a voltage signal changes from "HIGH" level to "LOW" level at the terminal of the electric control unit Ec on the side of the proximity sensor 41, thereby detecting that the handle 10 has been steered to the right or to the left.

Figure 3B:
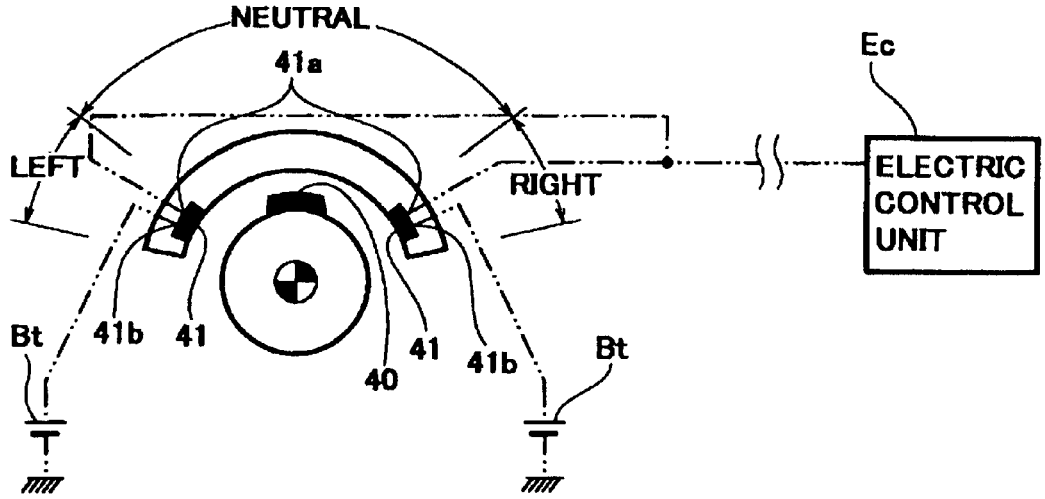
FIG. 3B is a schematic view showing another structure of the steering position sensor portion.

The above-identified configuration may be replaced by a configuration of FIG. 3B. Referring to FIG. 3B, one terminal (Ec side terminal) 41a of the two terminals of each of the proximity sensors 41 may be electrically connected to the electric control unit Ec, and the other terminal (earth side terminal) 41b of each of the proximity sensors 41 may be electrically grounded through a battery Bt. In this configuration, when the permanent magnet 40 comes close to the one of the proximity sensors 41, the proximity sensor 41 is turned ON (closed), and thereby a current flows from the earth side terminal 41b to the Ec side terminal 41a, i.e., from the battery Bt to the electric control unit Ec. As a result, the voltage signal changes from "LOW" level to "HIGH" level at the terminal of the electric control unit Ec on the side of the proximity sensor 41, thereby detecting that the handle 10 has been steered to the left or to the right.

FIG. 4A is a table showing signal levels (in this embodiment voltages) of respective portions of FIG. 3A at respective handle operation positions. FIG. 4B is a table showing signal levels (in this embodiment voltages) of respective portions of FIG. 3B at respective handle operation positions.

Figure 10:
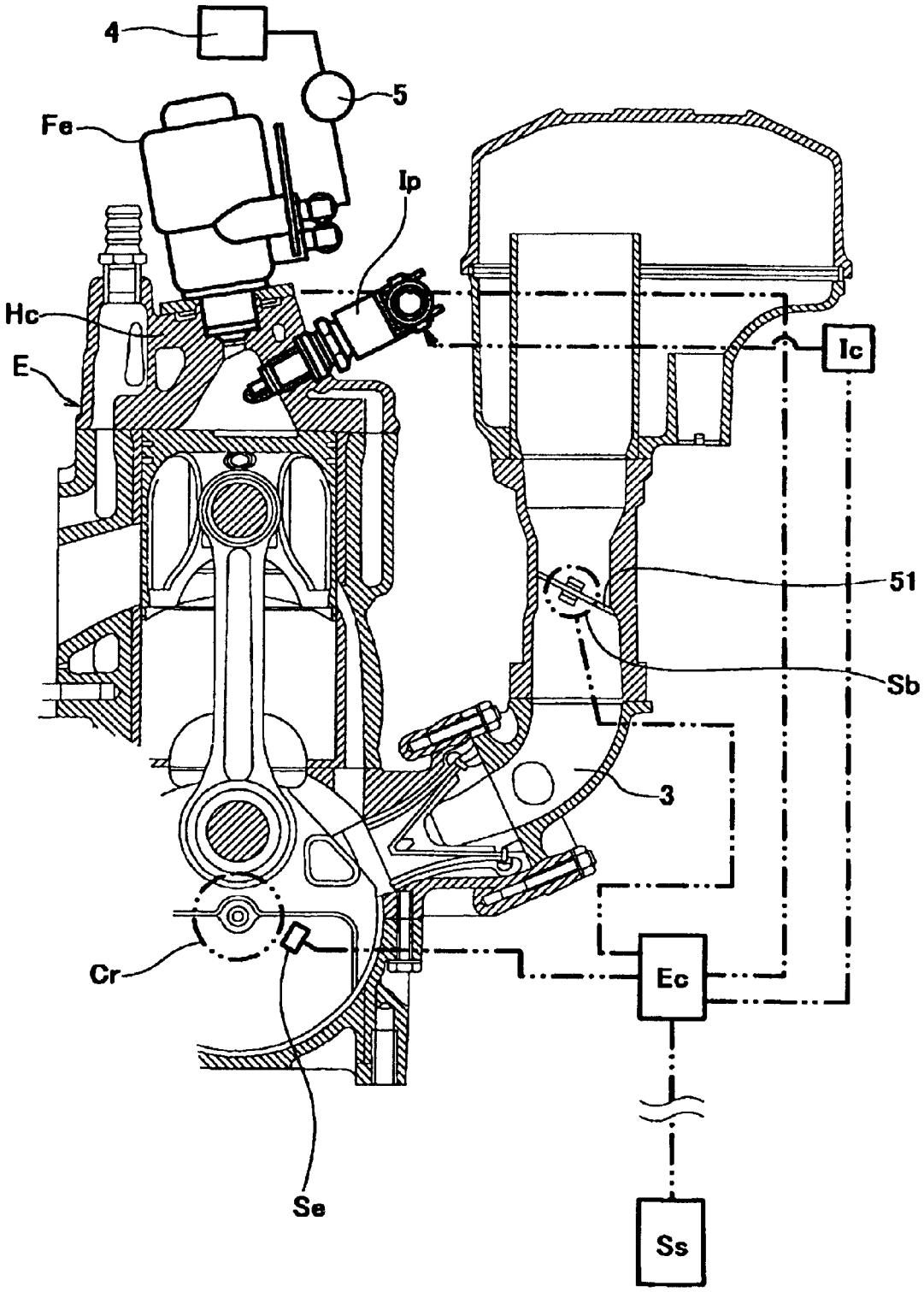
FIG. 10 is a view showing the configuration of FIG. 1 based on the relationship with an engine.

As shown in FIG. 10, in this embodiment, a throttle position sensor Sb is placed close to a butterfly valve 51 provided in an intake passage 3 of the engine E.

In addition, as shown in FIG. 10, an engine speed sensor Sc is placed in the vicinity of a crankshaft Cr.

Figure 1:
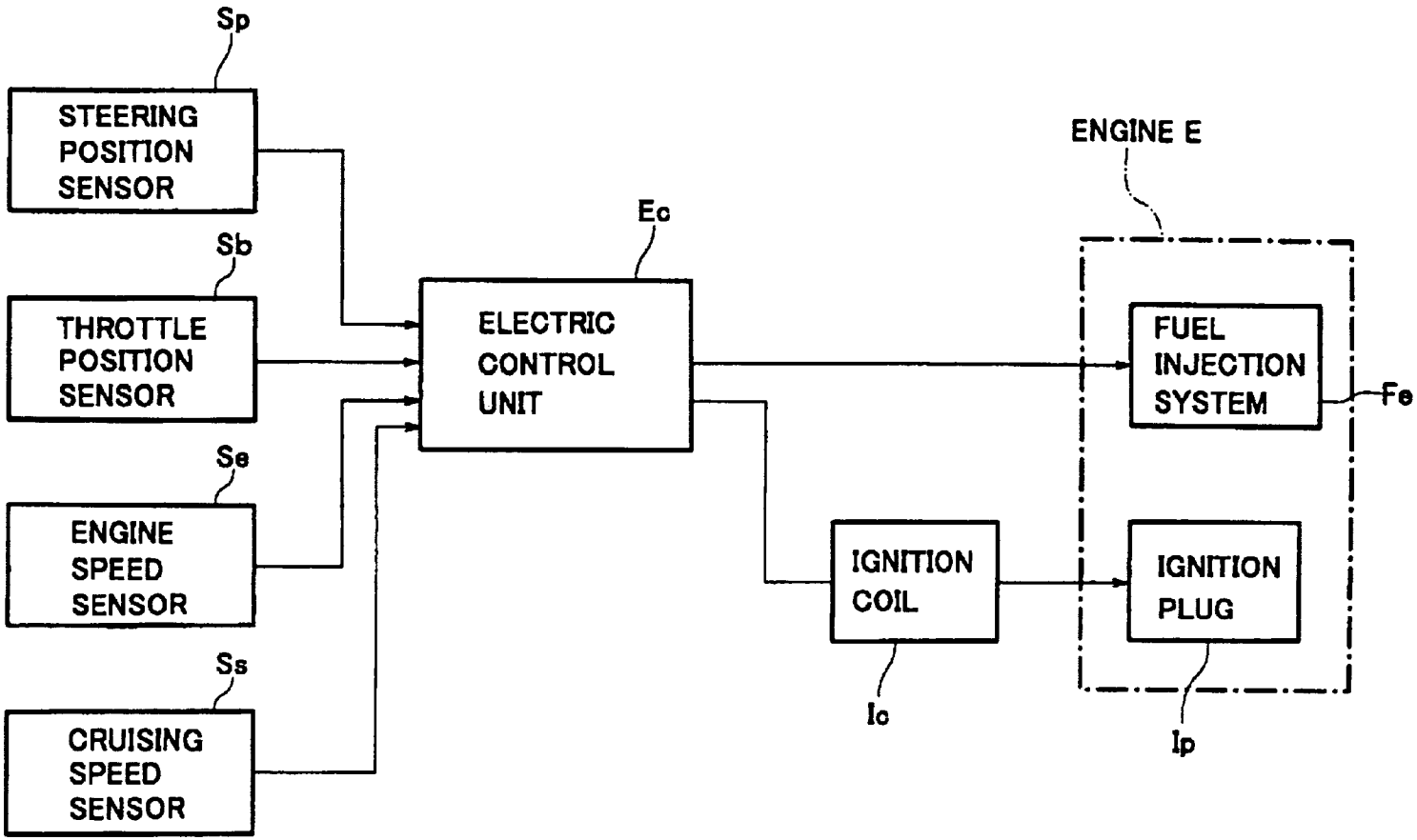
FIG. 1 is a block diagram showing a configuration of a control system of a jet-propulsion watercraft according to an embodiment of the present invention.

Further, as shown in FIGS. 1, 10, a cruising speed sensor (speed meter)Ss is provided for detecting a cruising speed of the personal watercraft, although its position is not specifically illustrated.

As shown in FIG. 1, the steering position sensor Sp, the throttle position sensor Sb, the engine speed sensor Se, and the cruising speed sensor Ss are respectively connected to the electric control unit Ec by means of signal lines (electric wires), thereby allowing signals detected by the respective sensors to be transmitted to the electric control unit Ec.

The electric control unit Ec is connected to a fuel injection system Fe provided in a cylinder head Hc of the engine E by means of a signal line (electric wire). The electric control unit Ec is also connected to an ignition cell Ic by means of the signal line (electric wire).

The ignition coil Ic is connected to an ignition plug Ip by means of an electric wire (high-tension code). In FIG. 10, reference numeral 4 denotes a fuel tank and reference numeral 5 denotes a fuel pressurizing pump.

In the jet-propulsion watercraft of this embodiment configured as described above, while the throttle-close operation of the throttle operation means is performed by a rider, and when the throttleclose operation of the throttle operation means and the steering operation of the steering operation means are detected, steering assist mode control is executed to allow the steering capability to be maintained. Besides, if the signal line connected to the steering position sensor Sp is disconnected while the watercraft is cruising in a normal state (e.g., planing), the steering assist mode control is not executed even when the throttle-close operation is detected.

Figure 2:
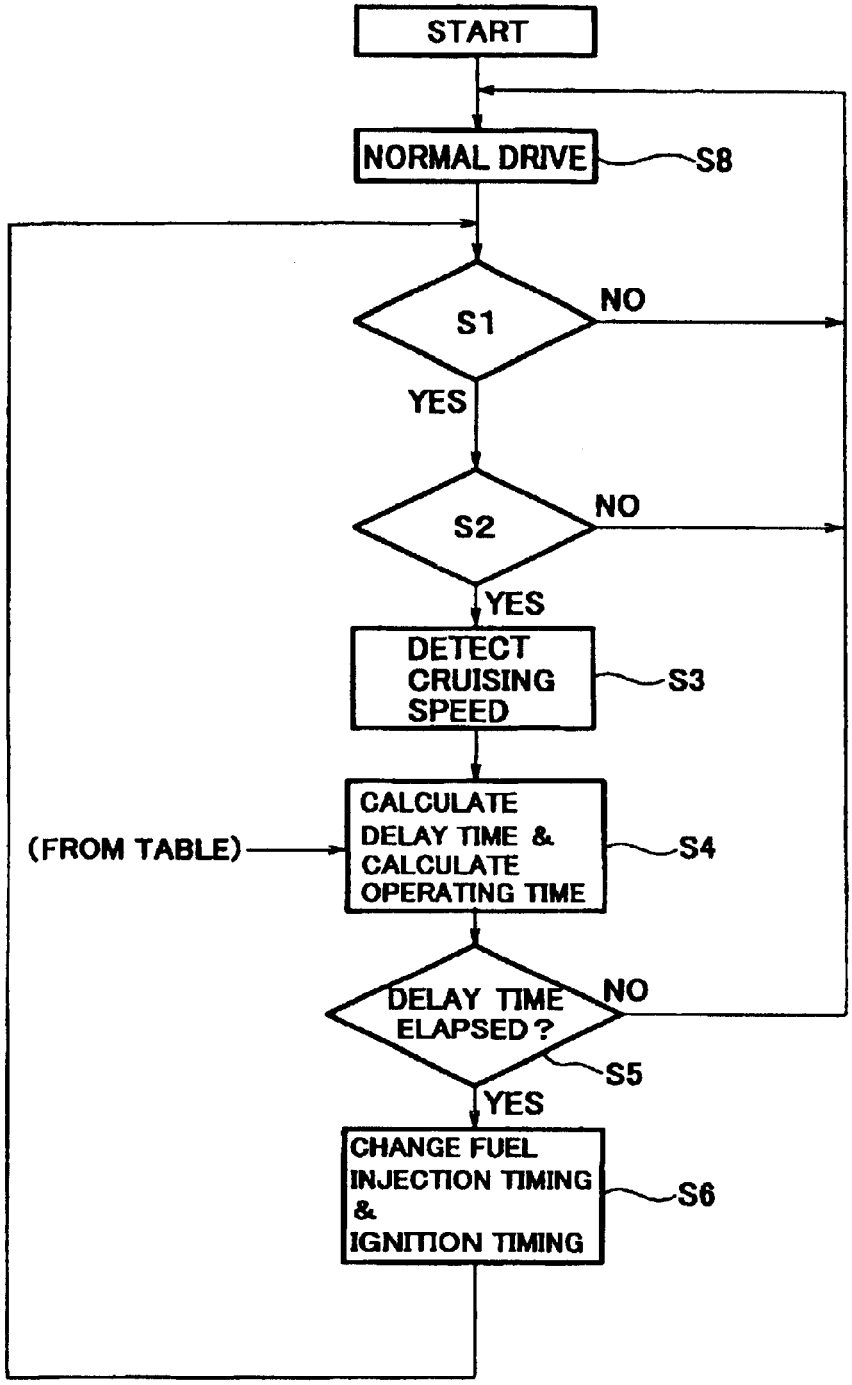
FIG. 2 is a flowchart showing a control process of components shown in FIG. 1.

Hereinbelow, a control process of a control program stored in a memory of a computer built in the electric control unit Ec, along with its function, will be described with reference to a flowchart of FIG. 2.

During cruising of the jet-propulsion watercraft, when the rider performs the throttle-close operation, the throttle position sensor Sb detects the throttle-close operation (Step 1 (S1)), and sends a detection signal to the electric control unit Ec.

In this state, when the rider rotates the steering handle 10 by a predetermined angle to the right or to the left (in this embodiment, by a rotational angle of approximately 20 degrees to the right or to the left), the steering position sensor Sp detects the steering operation (Step 2 (S2)) and sends a detection signal to the electric control unit Ec.

Then, the electric control unit Ec obtains a cruising speed detected by the cruising speed sensor Ss (Step 3 (S3)).

Figure 5:
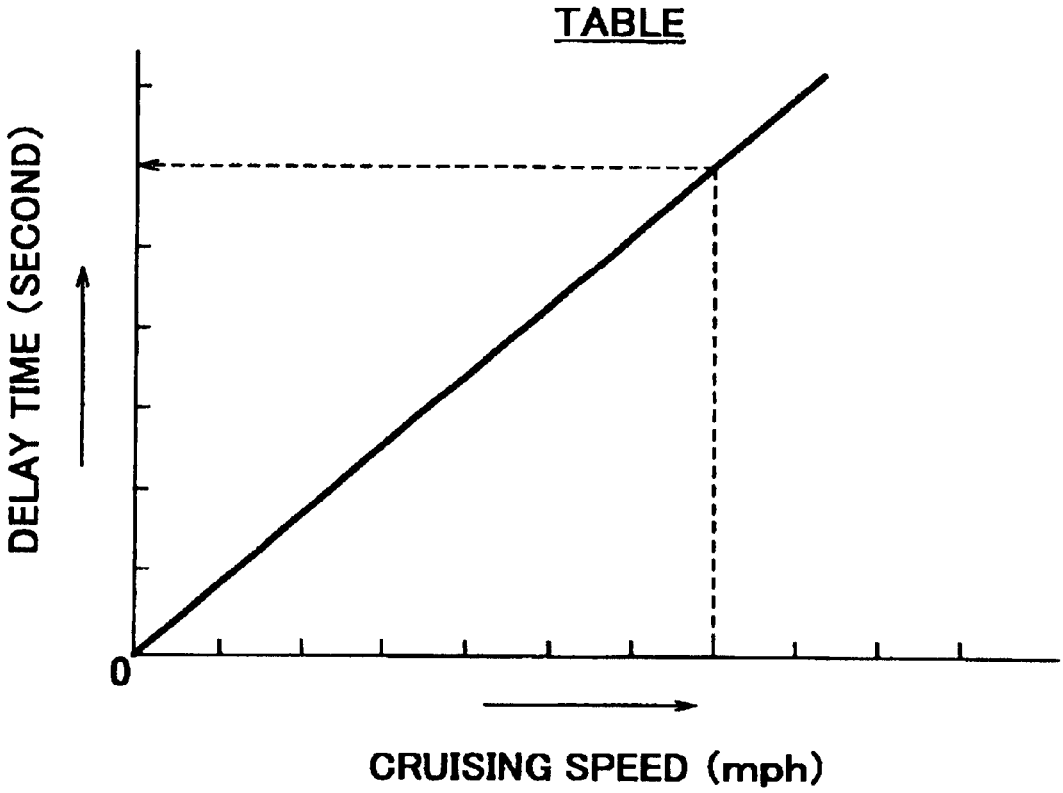
FIG. 5 is a table used in steering assist mode control.

Then, the electric control unit Ec determines a timing at which the steering assist mode control should be started, based on a table of FIG. 5 (table that defines the relationship among the cruising speed and the delay time) (Step 4 (S4)). As can be seen from the table of FIG. 5, the "delay time" is directly proportional to the cruising speed. Instead of being detected by the cruising speed sensor, the "cruising speed" may be calculated from the engine speed. In this case, it is desirable to obtain continuous engine speeds as data and calculate the cruising speed based on the obtained data in view of an inertia of the personal watercraft. This is because an accurate cruising speed is difficult to obtain only from a certain engine speed.

Then, the electric control unit Ec judges whether or not the timing delay (after which the steering assist mode control should be started) has elapsed (Step 5 (S5)), and when judging that the timing delay has elapsed, the electric control unit Ec starts the steering assist mode control to change the fuel injection timing and the ignition timing (in this embodiment, e.g., to set faster timings), thereby increasing the engine speed to a "predetermined engine speed" (Step 6 (S6)). The "predetermined engine speed" is determined in view of a characteristic of the personal watercraft or the like, (e.g., a turning characteristic of the watercraft or a characteristic due to the hull shape of the watercraft). In this embodiment, the predetermined engine speed is set to 3000 rpm. This set value may be determined to a suitable set value (e.g., 2500–3000 rpm). The set value may be fixed or may vary depending on the cruising speed of the watercraft.

The above-described control process is performed to allow the steering capability to be maintained even while the throttle-close operation is performed.

When the signal line (electric wire) connected to the steering position sensor Sp is disconnected in such configuration, the signal level of the signal from the steering position sensor Sp in the disconnected state is equal to the signal level of the signal in the state in which the handle 10 is not steered by a predetermined angle or more to the right or to the left, i.e., at a neutral position. For this reason, if the signal line (electric wire) is disconnected, the electric control unit Ec judges that the handle 10 is at the neutral position (the handle is not steered to the right or to the left). As a consequence, the steering assist mode is not employed even if the signal line is disconnected.

Figure 11:
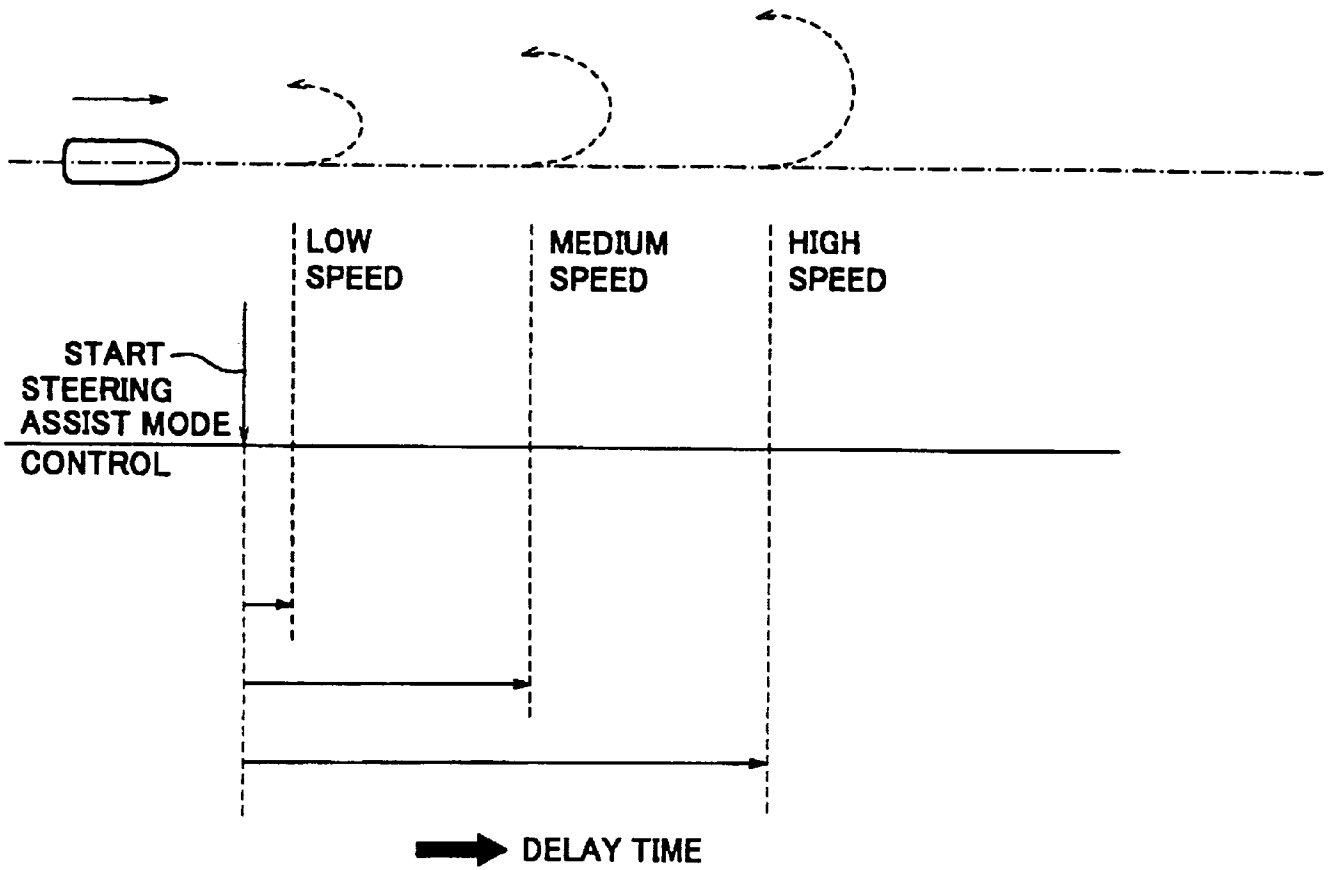
FIG. 11 is a schematic view showing a state of the personal watercraft according to the embodiment from a throttle-close operation state to a turning state, which state is represented for each of a low speed, a medium speed, and a high speed.

In the jet-propulsion watercraft, the steering assist mode control is executed according to the cruising speed so that the higher the cruising speed of the watercraft is, the longer the delay time is set. Thereby, as shown in FIG. 11, in any cases, the watercraft can be turned while keeping preferable attitude.

In this embodiment, in order to increase the engine speed to the predetermined engine speed, both of the fuel injection timing and the ignition timing are changed. Alternatively, in addition to these timings, the fuel injection amount may be changed, or otherwise, only one of these timings and the fuel injection amount may be changed.

While the steering assist mode control for changing the fuel injection timing and the ignition timing is executed at the timing delayed according to the cruising speed detected by the cruising speed sensor, the control can be simply executed using a fixed timing regardless of the cruising speed.

Figure 12:
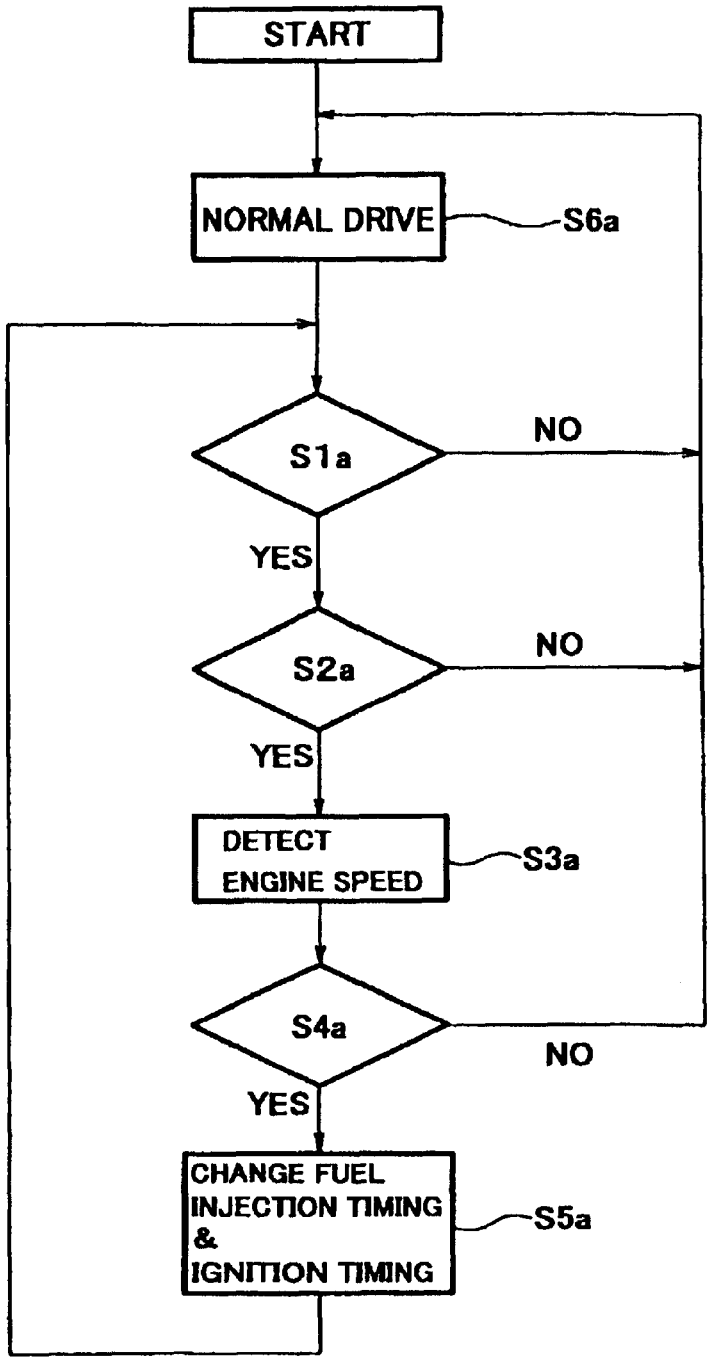
FIG. 12 is a flowchart showing a control process according to an example different from that of FIG. 2.

In the steering assist mode control of the previously described embodiment, the delay time is set in the control process. Alternatively, to simplify the control process, the steering assist mode control may be started earlier as shown in the flowchart of FIG. 12 and as described below. Specifically, when the throttle-close operation is detected, the steering assist mode control may be started while the engine speed is decreasing but is still relatively high. This will be described in more detail with reference to FIGS. 12, 13. When the rider performs the throttle-close operation, the throttleclose operation sensor Sb detects the throttle-close operation (Step 1a(S1a)) and sends a detection signal to the electric control unit Ec. With regard to the throttle-close operation, see a descending line Zb of FIG. 13 indicating the relationship between the engine speed and the engine power as the result of the throttle-close operation.

In this state, when the rider steers the handle 10 by the predetermined angle to the right or to the left (in this embodiment, by a rotational angle of approximately 20 degrees to the right or to the left), the steering position sensor Sp detects the steering operation (Step 2a(S2a)) and sends a detection signal to the electric control unit Ec.

Then, the engine speed sensor Se detects the engine speed at that point (Step 3a(S3a)).

Then, the electric control unit Ec judges whether or not the detected engine speed is smaller than a predetermined engine speed (e.g., 5500 rpm) (Step 4a(S4a).

Figure 13:
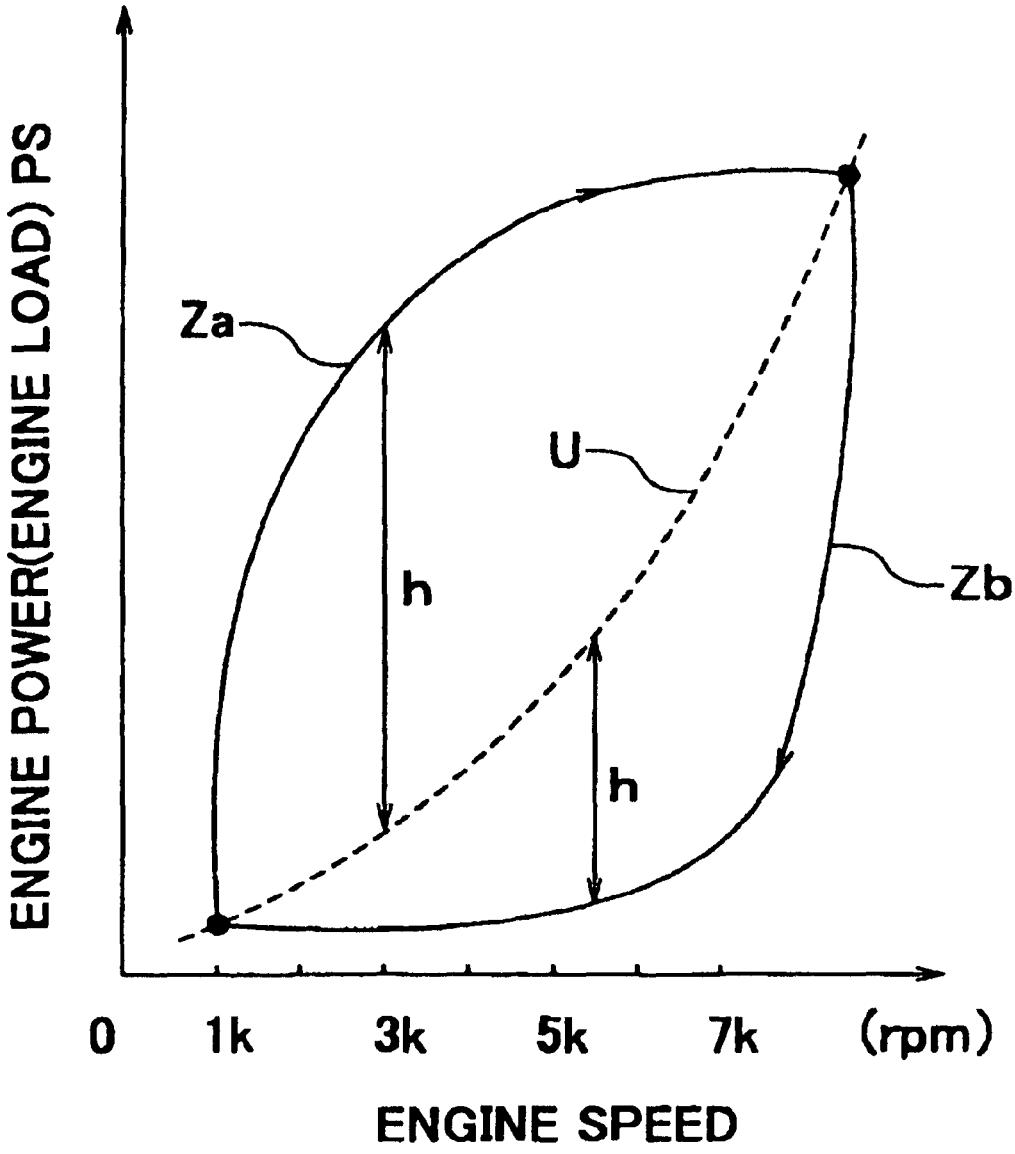
FIG. 13 is a graphic view with an engine power or load on a vertical axis and an engine speed (k="1000") on a horizontal axis, showing the relationship between an increase/decrease in the engine speed and the engine power, and an engine load to drive a water jet pump.

When judging that the engine speed is smaller than the predetermined speed (e.g., 5500 rpm), the electric control unit Ec starts the steering assist mode control to change (in this embodiment, increase) the fuel injection timing and the ignition timing or these timings and the fuel injection amount, thereby increasing the engine speed of the engine E to the predetermined engine speed (e.g., 3000 rpm) on a dashed line U of FIG. 13 (Step S5 (S5a)). In this case, without the steering assist mode control, the engine speed tends to decrease to an engine speed within an idling range in a very short time. More specifically, although the engine speed is 5500 rpm on the descending line Zb of FIG. 13, the engine power is too low to drive the water jet pump P, which looks like "enginebrake applied state", and the engine speed tends to decrease to the engine speed in the idling range in a very short time. In this state, in order to drive the water jet pump P, the engine speed of the engine E is increased to the predetermined engine speed (e.g., 3000 rpm) on the dashed line U of FIG. 13 (U represents an engine load to drive the water jet pump P by the steering assist mode control). In FIG. 13, difference h in the longitudinal direction between the dashed line U and an ascending line Za or the descending line Zb indicates the engine power causing acceleration/deceleration. When the steering assist mode control is started at the engine speed of 5500 rpm on the descending line Zb to change the engine speed to 3000 rpm on the dashed line U, an operation that increases the engine speed such as the change of the fuel injection timing or the like, becomes necessary.

In FIG. 13, an arrow of the ascending line Za and an arrow of the descending line Zb respectively indicate the increase and decrease in the engine speed.

Then, the electric control unit Ec sets back the fuel injection timing and the ignition timing to the initial state (normal drive state) (Step 6a(S6a)), and terminates the steering assist mode control. In this case, when a predetermined condition occurs, for example, when the steering position sensor Sp has detected that the rider steers back the handle 10 to its initial position, the steering assist mode control may be terminated.

The steering assist mode control can be simply executed in the above-described manner. The present invention is applicable to the control process of FIG. 12 similarly to the control process of FIG. 2, and the similar functions and effects are obtained.

The present invention is not limited to only one of forward movement and rearward movement of the watercraft, but are applicable to both of the forward movement and rearward movement.

In the above-described example, the steering nozzle 18 that ejects water to any direction, the water jet pump P for supplying the water to the outlet port 21K forward of the steering nozzle 18, and an engine E for driving the water jet pump P are provided as steering means, but the steering means is not limited to these. Any steering means may be employed in the present invention so long as it has steering capability.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

[1. A jet-propulsion watercraft, comprising:

a water jet pump including an outlet port and a steering nozzle, said water jet pump pressurizing and accelerating sucked water and ejecting the water from the outlet port to propel the watercraft as a reaction of the ejecting water;

a steering operation means operating in association with the steering nozzle of the water jet pump;

a steering sensor comprised of a proximity sensor, for detecting a steering operation of the steering operation means;

a steering means for steering the watercraft adapted to be subjected to a steering assist mode control, when a signal indicating that the steering position sensor has detected the steering operation is received; and a control device connected to the steering position sensor by a signal line, the control device giving a signal to the steering position sensor and detecting a signal in the signal line indicating that the steering operation means is or is not steered, wherein the signal in the signal line does not change when the steering operation means is not steered, and thereby the control device does not execute the steering assist mode control, and the signal in the signal line changes when the steering operation means is steered, and thereby the control device executes the steering assist mode control.]

[2. The jet-propulsion watercraft according to claim 1, wherein the signal in the signal line being detected by the control device is a High voltage level signal which is lower than a predetermined voltage, and the signal being given from the control device to the steering position sensor is a High voltage level signal when the steering operation means is not steered.]

[3. The jet-propulsion watercraft according to claim 1, wherein the signal in the signal line being detected by the control device is a Low voltage level signal which is higher than a predetermined voltage, and the signal being given from the control device to the steering position sensor is a Low voltage level signal when the steering operation means is not steered.]

4. A jet-propulsion watercraft, comprising:

a water jet pump including an outlet port and a steering nozzle, said water jet pump pressurizing and accelerating sucked water and ejecting the water from the outlet port to propel the watercraft as a reaction of the ejecting water;

a steering operation means operating in association with the steering nozzle of the water jet pump;

a steering position sensor for detecting a steering operation of the steering operation means, said steering position sensor comprising a proximity switch having two proximity sensors provided on a portion of a rotational shaft of the steering operation means of the watercraft,

*a control device connected to the steering position sensor by a signal line, the control device giving a signal to the steering position sensor and detecting a signal in the signal line indicating that the steering operation means is or is not stored,* wherein one terminal of each of the proximity sensors is connected to the control device by the signal line to allow a High voltage level of the signal to be applied to the one terminal from the control device, and the other terminal of each of the proximity sensors is electrically grounded, when the steering operation means is steered, the proximity sensor [placed on steered side is activated to short the terminals of the proximity sensor] placed on a steered side is activated to short the terminals of the proximity sensor to cause the voltage to change from High level to Low level; *and* a steering means for steering the watercraft adapted to be subjected to a steering assist mode control, when a signal indicating that the steering position sensor has detected the steering operation is received; [and] *wherein*

[a control device connected to the steering position sensor by a signal line, the control device giving a signal to the steering position sensor and detecting a signal in the signal line indicating that the steering operation means is or is not steered, wherein]

the signal in the signal line does not change when the steering operation means is not steered, and thereby the control device does not execute the steering assist mode control, and the signal in the signal line changes when the steering operation means is steered, and thereby the control device executes the steering assist mode control.

5. A jet-propulsion watercraft, comprising:

a water jet pump including an outlet port and a steering nozzle, said water jet pump pressurizing and accelerating sucked water and ejecting the water from the outlet port to propel the watercraft as a reaction of the ejecting water;

a steering operation means operating in association with the steering nozzle of the water jet pump;

a steering position sensor for detecting a steering operation of the steering operation means, said steering position sensor comprising a proximity switch having two proximity sensors provided on a portion of a rotational shaft of the steering operation means of the watercraft,

*a control device connected to the steering position sensor by a signal line, the control device giving a signal to the steering position sensor and detecting a signal in the signal line indicating that the steering operation means is or is not steered,* wherein one terminal of each of the proximity sensors is electrically grounded through the control device by the signal line, and the other terminal of each of the proximity sensors is connected to an electric power source to allow a High voltage level of the signal to be applied to the other terminal from the electric power source;

when the steering operation means is steered, the proximity sensor placed on steered side is activated to short the terminals of the proximity [switch] *sensor* to cause the voltage level of the signal to change from [High] *Low* level to [Low] *High* level; *and* a steering means for steering the watercraft adapted to be subjected to a steering assist mode control, when a signal indicating that the steering position sensor has detected the steering operation is received; [and] *wherein*

[a control device connected to the steering position sensor by a signal line, the control device giving a signal to the steering position sensor and detecting a signal in the signal line indicating that the steering operation means is or is not steered, wherein]

the signal in the signal line does not change when the steering operation means is not steered, and thereby the control device does not execute the steering assist mode control, and the signal in the signal line changes when the steering operation means is steered, and thereby the control device executes the steering assist mode control.

*6. The jet-propulsion watercraft of claim 4, wherein the control device is an electric control unit comprising a computer having a memory.*

*7. The jet-propulsion watercraft of claim 6, wherein the memory of the computer includes a control process of a control program stored therein.*

*8. The jet-propulsion watercraft of claim 6, wherein the electric control unit determines a timing at which the steering assist mode control should be started.*

*9. The jet-propulsion watercraft of claim 6, wherein the starting of the steering assist mode control includes a timing delay that is directly proportional to a cruising speed of the jet-propulsion watercraft.*

*10. The jet-propulsion watercraft of claim 5, wherein the control device is an electric control unit comprising a computer having a memory.*

*11. The jet-propulsion watercraft of claim 10, wherein the memory of the computer includes a control process of a control program stored therein.*

*12. The jet-propulsion watercraft of claim 10, wherein the electric control unit determines a timing at which the steering assist mode control should be started.*

*13. The jet-propulsion watercraft of claim 10, wherein the starting of the steering assist mode control includes a timing delay that is directly proportional to a cruising speed of the jet-propulsion watercraft.*

* * * * *